Oct. 30, 1928. 1,689,296
O. D. REDDING
VALVE FOR HIGH PRESSURE AND HIGH TEMPERATURE PURPOSES
Filed March 2, 1927 2 Sheets-Sheet 1
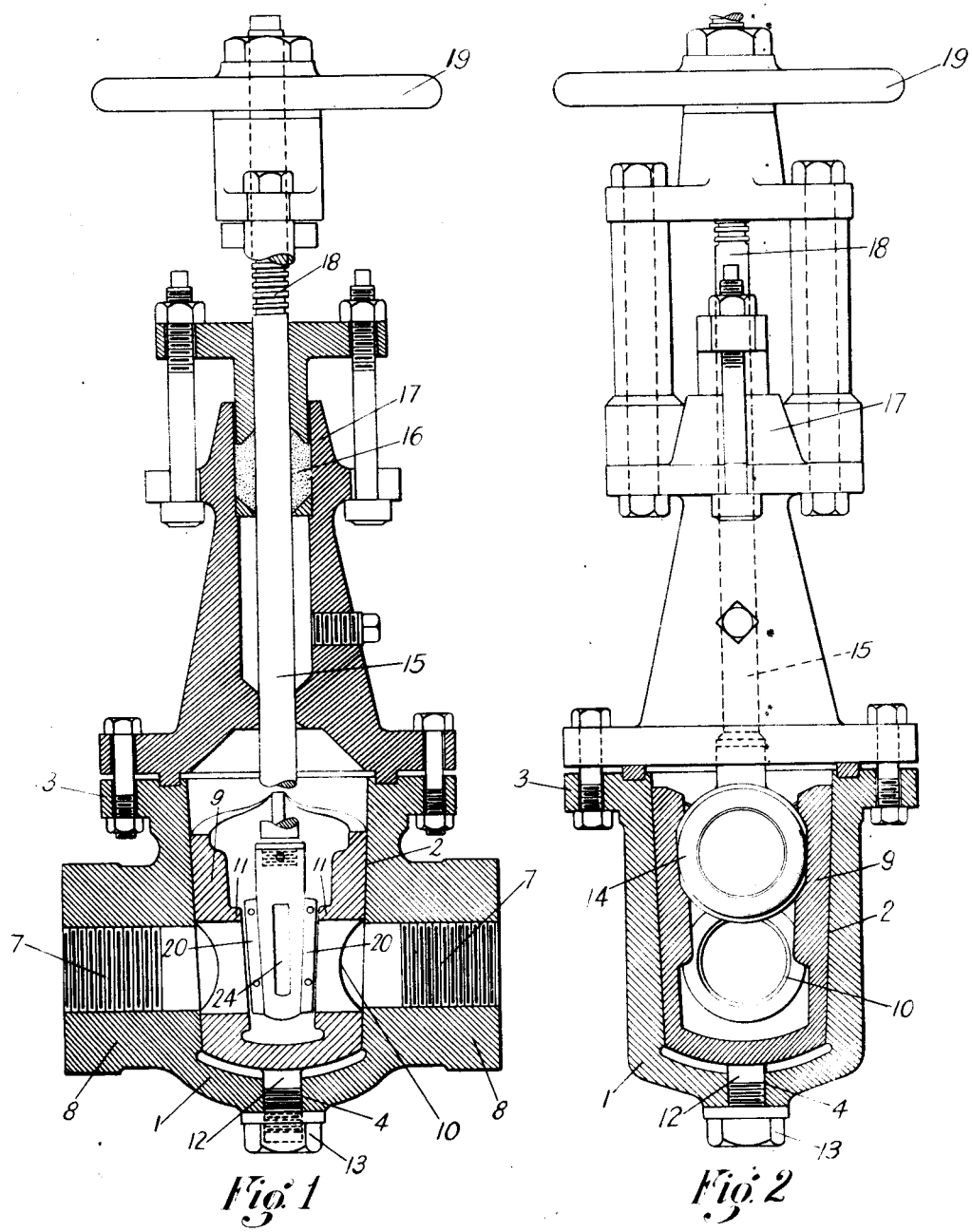
Orriond Redding
INVENTOR.
BY
ATTORNEY.

Oct. 30, 1928.                                    1,689,296
O. D. REDDING
VALVE FOR HIGH PRESSURE AND HIGH TEMPERATURE PURPOSES
Filed March 2, 1927        2 Sheets-Sheet 2
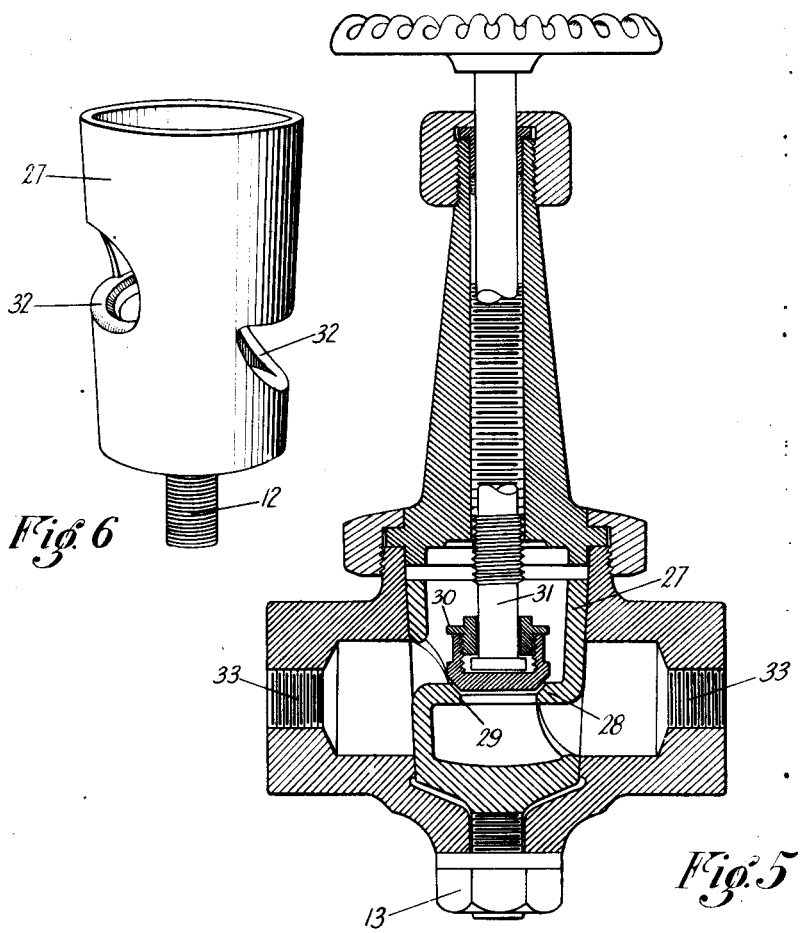
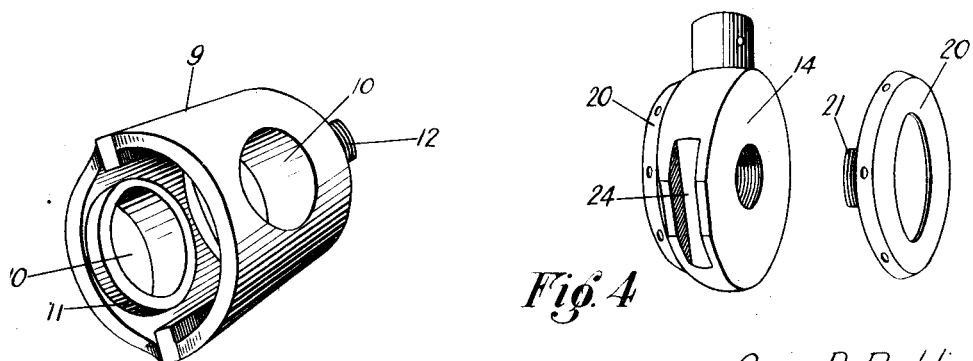

Patented Oct. 30, 1928.

1,689,296

UNITED STATES PATENT OFFICE.

ORRION D. REDDING, OF COLUMBUS, OHIO, ASSIGNOR TO THE VALVE EQUIPMENT COMPANY, OF COLUMBUS, OHIO, A CORPORATION OF OHIO.

VALVE FOR HIGH-PRESSURE AND HIGH-TEMPERATURE PURPOSES.

Application filed March 2, 1927. Serial No. 172,124.

My invention relates to valves for high pressure and high temperature purposes and has to do with the provision of a valve structure which lends itself readily to the use of straight line boring in the construction thereof. Likewise, it has to do with the provision of a valve having certain structural characteristics which serve to ensure the elimination of disadvantages present in prior art devices, such as leakage, warpage and expanding, that are likely to occur to an undesirable extent under the effects of the high pressure and high temperature conditions to which the valve is subjected.

In prior art devices, it has been customary to provide valve seats in the form of externally threaded rings which screw into internally threaded sockets in the valve casing. Experience has shown that the high pressure and high temperature conditions to which these rings are subjected serve to cause the rings to creep away from the surfaces against which their rear surfaces abut and also results in a corroding, wire drawing and leakage through the threads of the back face of the seat rings and sockets. There are other disadvantages of the prior art devices that will appear as this description progresses.

One object of my invention is to provide a valve wherein the valve seats are removable and replaceable at will, in an extremely simple manner, and wherein the valve seats are held in proper relation to the valve casing by a wedging action.

This application is a continuation in part of the application filed July 18, 1925, Serial No. 44,449.

Another object of my invention is to provide a valve that takes the form of integral parts of a valve cage and to provide adjustments for this valve cage to compensate for the wear and tear and to ensure against leakage between the walls of the valve cage and the main body of the valve casing.

A further object of my invention is to provide a valve seat that takes the form of integral parts of a valve cage, which valve cage may be utilized to shut off the flow of fluid through the valve while repairs or adjustments are being made.

A still further object of my invention is to provide a valve having numerous features of adjustability, a novel feature of these features of adjustability being adjustable valve faces.

A still further object of my invention is to provide valve seats that take the form of integral parts of a valve cage, and equip this valve cage with guides, that correspond to slots in the gate body of the valve, for governing the path of travel of the gate body and ensuring accurate alignment and seating thereof.

Other and further objects of my invention may be had from the following description and the preferred embodiment of my invention may be seen in the accompanying drawings wherein similar characters of reference designate corresponding parts and wherein Figure 1 is a vertical longitudinal cross-section of a gate valve constructed in accordance with my invention.

Figure 2 is a vertical longitudinal view taken transversely to the view in Figure 1 and partly in section to show added features of the gate valve structure.

Figure 3 is a perspective view of the valve cage employed in the valve.

Figure 4 is a perspective view of the valve portion showing the adjustability or removability of the faces of the valve.

Figure 5 is a modification showing my invention applied to a globe valve.

Figure 6 is a side elevational view of the valve cage adapted to use in a valve of the globe type.

With reference to the drawings, I have shown a valve, constructed in accordance with the present invention, comprising a casing 1. Preferably, this casing is made of forged steel, so as to possess maximum mechanical strength, be of symmetrical outline and, at the same time, be devoid of bulkiness or excessive weight. In this instance, the casing is formed to include a centrally disposed tapered valve chamber 2, possessing its greatest diameter at the flanged end 3 of the casing, and its smallest diameter at the opposite or lower end of the casing. The extreme lower end of the valve chamber 2 terminates in a small diameter, vertical bore 4 which extends through the valve casing 1. Also, the casing 1 is provided with longitudinally extending, axially aligned fluid passages 7, which establish communication between the chamber 2 and the pipe attaching ends 8 thereof.

Mounted within the chamber 2 is a valve cage 9. This cage includes an integral hollow body preferably formed from some inert metal that is impervious to the destructive action of acids or alkaline fluids and that will readily lend itself to match operations. The cage 9 is of a tapering form in order to correspond to, and fit snugly in, the valve chamber 2 and, as shown, is provided with the ports 10 which register with the fluid passages 7. As shown in Figure 1, the cage is provided internally with opposed valve seats 11 which are integral with the cage 9 and concentric with the ports 10.

The lower end of the cage 9 is provided with a reduced threaded extension 12 projecting through the vertical bore 4 in the lower end of the chamber 2 and adapted to receive the retaining nut 13. By means of this threaded extension 12, the container is held and secured within the chamber 2. However, it will be readily seen by referring to Figures 1 and 2 of the drawings that the cage 9 is so constructed with relation to the valve chamber 2 that the cage 9 will have a certain amount of end play allowing the cage to be moved in either direction as it varies in size, due to expansion or contraction, or, the wearing away of the valve cage and the walls of the valve chamber 2. Thus, a tight seal may always be maintained between the valve cage 9 and the valve chamber 2.

It will be obvious that, by removing the nut 13 and the valve superstructure, to be hereinafter described, the valve cage 9 may be removed bodily from the casing 1, permitting the valve seats 11 to be refaced or redressed, without disturbing the secured position which the casing may occupy in the fluid line. By loosening the nut 13, the valve cage 9 may be given a quarter turn in either direction to prevent flow of the fluid while repairs or adjustments are being made to some internal part of the valve. It will also be obvious that, by the inclusion of the cage 9 and the integral valve seats formed therewith, the process or problem of manufacturing the forged steel casing is materially simplified. For example, the operation of valve seating is confined to the structure of the cage, since the valve cage may be readily fashioned or machined to produce desired shapes or contours because of the material from which it is formed.

The closure means utilized in connection with the valve may be one of many standard forms. In Figures 1 and 2, the closure means comprises what is known as the "gate" type of valve closure, although it is obvious that many different types of closure means may be provided without departing from the spirit of my invention.

In Figures 1 and 2, the closure means consists of a wedge-shaped gate body 14, including a stem 15 which passes through a packing 16 provided in connection with the bonnet 17 of the valve casing. The upper end of the stem 15 is threaded, as at 18, for the reception of the internally threaded manipulating wheel 19 which, upon being rotated, effects the rise and fall of the stem 15 and corresponding movement on the part of the gate body 14. The manipulating wheel 19 may be supported as shown in Figure 2 or in any other well known manner.

The gate body 14 is of a novel design in that its opposed seating surfaces are constituted of removable discs 20 (see Figure 4) formed with axially arranged, inwardly projecting threaded studs 21. These studs 21 are received within threaded openings 22 provided in the body 14. By virtue of the design, the discs 20 may be adjusted relatively to compensate for the effects of wear, shims being used as desired. Also, worn and damaged discs may be removed readily from the gate assembly and new and perfect parts substituted in their place.

In operation, it will be seen that, when the stem 15 is lowered, the outer surface of the discs 20 will be wedged into seated engagement with the opposed valve seats 11, formed integrally with the cage 9, thereby closing the valve openings and preventing the passage of fluid therethrough. However, upon the elevation of this stem 15, the body 14 will be lifted so as to be out of the path of the fluid travel or flow from one of the passages 7 to the other, as is customary in valve construction. The gate body 14, as well as the discs 20, are also formed from an inert, acid and alkaline resisting metal but of different composition than that metal forming the valve cage. By making these parts of different metals, the wear on the discs 20 will be reduced to a minimum degree. The interior of the valve cage 9 is provided with longitudinally extending ribs 23 adapted to be secured within the grooves 24 provided in the gate body 14. The ribs 23 serve as guides governing the vertical path of travel of the gate body.

In Figure 5, I have shown a modified form of my invention that is substantially of exactly the same construction as the forms previously described, except that the valve cage 27 is formed especially for the seating of disc or globe valves. To this end, the valve cage 27 is provided, midway of its length, with a partition 28 in which is formed a valve seat 29. Arranged for cooperation with this seat 29, is a closure member 30 actuated by a manually operated movable stem 31. On the opposite sides of the partition 28, the valve cage 27 is provided with inlet and outlet ports 32 communicating with aligned pipe passageways 33.

In addition to the advantages of the valve previously described, this type of valve has an additional advantage in that it can be readily adapted to fluid pressure conditions existing within the pipe line. Frequently, it occurs, after a valve has been inserted into the pipe line and is ready for operation, that inspection discloses that the closure member faces the fluid pressure in the wrong direction. Heretofore, this has necessitated the removal of the entire valve from the line and the turning of the same around to assume correct position. This is avoided in this type of valve, since it is merely necessary to rotate the valve cage 27 within its seat and the same end can be obtained, without in any way disturbing the applied or operative position of the valve casing in connection with the fluid line.

By reference to the preceding description and the drawings attached hereto, it will be clearly obvious that I have provided a valve wherein the valve seats take the form of integral parts of a valve cage that is removable and replaceable at will and is held in proper relation with the valve casing by an adjustable wedging action. This permits a tight fluid seal to be maintained between the valve cage and the valve casing at all times.

It will also be obvious that such construction will materially simplify the manufacturing of forged steel casings, in that the operation of the valve seating is confined to the structure of the cage that, because of the material from which it is formed, may be readily fashioned or machined to produce desired shapes and contours. Such an arrangement permits the passages to be formed in the body in longitudinal alignment or axial registration, since the problem of valve seating is localized in the valve cage and not in any way addressed to the construction of the casing. By reason of this construction, it will be seen that a forged steel casing may be provided, the interior of the casing being devoid of the curved partition walls and other baffles commonly provided in the usual form of cast body, and the chambers and passages formed by the die operations or lathe chucking and boring operations. By both methods, accuracy in workmanship, as well as speed and economy in production, may be obtained.

Furthermore, it will be obvious, by reference to the preceding description and the drawings attached hereto, that I have provided a valve having many features of adjustability, and a valve wherein it is possible to reface and redress the valve seats or adjust the working parts of the valve without disturbing the secured position which the casing may occupy in the fluid line.

It will likewise be obvious that the valve cage is forcibly held so that its outer periphery is in fluid-tight contact with the interior walls of the casing in such a way that the fluid is excluded from access to the threads of the valve extension 12. The valve seats being integral parts of the cage, there is no danger of leakage behind such valve seats. Then, the valve itself is firmly guided by its slots upon the vertical ribs of the cage in such a manner that its seating movement firmly guides the valve faces into wedge-seating position, the faces being adjustable in advance to ensure proper sealing action. Thus, these elements not only ensure adequate seating, but they ensure adequate resistance to unseating and make a compact and efficient whole.

Another feature of my invention consists in the fact that I have provided a valve casing with a central well of circular cross-section and with a valve cage whose exterior contour closely fits into said well and whose interior is provided with valve seats whose contacting surfaces are divergent and flat to receive a valve with faces that are divergent and flat. With such a structure, the valve cage has a contour permitting the shutting off of the flow of fluid through the valve by giving the cage a quarter turn. At the same time, while still having this advantage, the valve seats carried by the cage, having flat contact surfaces, make it possible to force the valve with great firmness against its seat without wedging it so tightly as to render the opening of the valve difficult. In addition to this, the substantially cylindrical well and the valve cage with a substantially cylindrical exterior can be made readily and at a low cost.

Having thus described my invention, what I claim is:

1. In a high temperature valve structure, a valve casing having a valve chamber disposed therein, a valve cage adapted to interfit with said valve chamber, said valve cage having internally raised valve seats integral therewith and said valve cage being adjustable by means externally of said casing to shut off the flow of fluid through the valve structure while repairs or adjustments are being made to the said valve structure.

2. A valve structure comprising a casing, a valve cage having a fluid-tight seal with the walls of said casing, a valve movable in said cage with slots in the sides thereof and ribs on said valve cage extending above said cage, and wing-like extensions of said cage for reenforcing said ribs.

3. A high temperature valve structure comprising a casing having a well therein of frusto conical form, a valve cage whose exterior conforms to said well and is rotatably adjustable therein by means externally of said casing, spaced valve seats within said cage, said valve seats being flat.

4. A high temperature valve structure comprising a casing having a well therein of frusto conical form, a valve cage whose exterior conforms to said well and is rotatably adjustable therein by means externally of said casing, spaced valve seats within said cage, said valve seats being integral with said cage and having flat contacting surfaces, and a valve operating to seat on said seats.

5. Valve structure comprising a valve casing, a removable valve cage, said cage having a closed bottom and being circular in exterior cross-section and having opposing valve seats integrally formed on its interior, said valve seats having flat divergent valve faces, and a threaded bolt integrally formed on its base.

6. In a high temperature valve structure, a valve casing having a well therein of frustro-conical form, a valve cage constructed to have a wedging fit in such well, said valve cage and such well being complementally formed to permit rotation of said cage in such well, a threaded bolt on one end of said cage and extending through a wall of said casing, a nut on said bolt for drawing said cage into fluid-tight contact with the walls of such well under varying temperature and pressure conditions, said cage having ports therethrough, a raised integral and flat valve seat on the interior of said cage, a valve operable in said cage, means for operating said valve, and means for guiding said valve into fluid-tight contact with said valve seat.

7. In a valve structure, a valve casing having a well therein of frustro-conical form, a valve cage constructed to have a wedging fit in such well, said valve cage and such well being complementally formed to permit rotation of said cage in such well, a means connected to said cage and operable from without said casing for drawing said cage into fluid-tight contact with the walls of such well under varying temperature and pressure conditions, said cage having ports therethrough, raised integral and flat valve seats on the interior of said cage, and disposed in converging relation to each other, a valve reciprocable in said cage, said valve being of wedge form, means for operating said valve, and means for guiding said valve into fluid-tight contact with said valve seat.

8. In a valve structure, a valve casing having a well therein of frustro-conical form, a valve cage constructed to have a wedging fit in such well, said valve cage and such well being complementally formed to permit rotation of said cage in such well, a means connected to said cage and operable from without said casing for drawing said cage into fluid-tight contact with the walls of such well under varying temperature and pressure conditions, said cage having ports therethrough, raised integral and flat valve seats on the interior of said cage, and disposed in converging relation to each other, a valve reciprocable in said cage, said valve being of wedge form, means for operating said valve, and means for guiding said valve into fluid-tight contact with said valve seat, the taper of said valve and the converging relation of said valve seats being such as to permit seating of the valve faces upon said seats substantially without sliding action.

9. In a valve structure, a valve casing having a well therein of frustro-conical form, a valve cage whose exterior conforms in shape to the walls of such well, said cage having ports therein, raised valve seats on the interior of said cage and surrounding such ports, said valve seats being flat and divergent, a wedge-shaped valve reciprocable into and out of seating relation with said valve seats, and means connected to said cage and operable from without said casing for drawing said cage into fluid-tight contact with the walls of such well under varying temperature and pressure conditions.

10. In a valve structure, a valve casing having a well of frustro-conical form therein, a valve cage complentally formed externally to fit such well, means for adjustably forcing said cage into fluid-tight relation to said well, flat divergent valve seats on the interior of said cage and surrounding ports in the walls thereof, a wedge-shaped valve, and means for moving said valve into and out of operative relation to said valve seats, the faces of said valve and the exterior walls of said cage all diverging in the same direction.

In testimony whereof I hereby affix my signature.

ORRION D. REDDING.